UNITED STATES PATENT OFFICE.

JAS. S. WETHERED AND SELIM E. WOODWORTH, OF SAN FRANCISCO, CAL.

IMPROVED PROCESS FOR TREATING THE ORES OF THE PRECIOUS METALS.

Specification forming part of Letters Patent No. 31,499, dated February 19, 1861.

*To all whom it may concern:*

Be it known that we, JAMES S. WETHERED and SELIM E. WOODWORTH, of the city and county of San Francisco, and State of California, have invented a new and Improved Method of Treating Ores Containing Precious or other Metals, which we call Wethered and Woodworth's method for treating ores; and we do hereby declare that the following is a full, clear, and exact description of the operation of the same.

The nature of our invention relates to a process of mixing pulverized ores containing precious metals—such as gold, &c.—with certain other substances and subjecting the whole mixture to the action of steam of a high temperature while successively exposed to the action of stirrers and mullers, for the purpose of effecting thorough amalgamation of the gold or other precious metal with the mercury forming part of the mixture.

The apparatus used in this process consists of two steam-tight vessels provided with central shafts, the construction of which vessels and shafts may be similar to the central vessel and shaft in the amalgamator patented by the applicants on the 27th day of November, 1860.

The steam used in the process which is the subject of the present application may be introduced through the hollow shafts of the vessels in the same manner as it is described in the said patent.

The shaft of the first vessel into which the pulverized ore is placed is provided with a spider-frame and stirrers inside of the vessel, which, revolving together with the shaft, serve to keep the pulverized ore and other substances placed in the vessel in a state of constant agitation.

The shaft of the second vessel is provided with a spider-frame, to which drags or mullers are attached, which, as they are moved around by the revolving shaft and spider-frame, serve to facilitate the amalgamation of the material subjected to their action. The construction, however, of these parts forms no subject of our invention and application, and may be varied in many respects.

The ore is first pulverized together with charcoal or other carbons. We find it convenient to use the ashes and charcoal from under the boiler-fires for this purpose. This mixture is placed in the first vessel, containing mercury and a strong pickle (even to a saturated solution) of common salt. In many cases, depending on the nature of the ores, we use also a strong solution of soda-ash. Steam of a high temperature is then introduced into the vessel, and the mixture is subjected to the action of the steam and the agitation produced by the revolving stirrers for a period of thirty minutes, more or less. The mixture is then drawn off into the second vessel, where water is added, and the whole is again subjected to the action of steam and to the operation of the mullers until a thorough amalgamation of the previous metal and mercury has been effected. By pulverizing the ores dry, in combination with the carbon, the powdered ore combines mechanically by adhesion with the particles of carbon, and thereby its specific gravity is much reduced, so as to prevent it from settling so readily in the solution of salt. Thus it will be more completely saturated with the pickle. The heat to which the powdered ore is subjected causes a part of the sulphur and arsenic (with which most of our ores are mixed) to be evolved and to be absorbed by the carbon, while the alkali contained in the ashes and the strong alkali of the soda-ash act as a solvent, in a great measure, to the silica and selenium, forming component parts of our ores. The silicon coating that many minute particles of gold are covered with is broken by the expansion of the metal under the action of the heat, and the metal is thus exposed to the amalgamating action of the mercury. When the mixture is in the second vessel, the attrition produced by the action of the mullers facilitates the detaching of the precious metal from extraneous matter, and thereby causes it to readily amalgamate with the mercury.

Having described our invention, what we claim, and desire to secure by Letters Patent, is—

The above-described process of treating ores, consisting of the use of steam, in combination with a mixture of pulverized ore, carbon, a solution of salt, soda-ash, and mercury, in the manner and for the purpose as above set forth.

JAS S. WETHERED.
S. E. WOODWORTH.

Witnesses:
WM. HENRY TIFFANY,
F. J. THIBAULT.